F. Monroe,
Flour Sieve.
Nº 66,867.   Patented July 16, 1867.
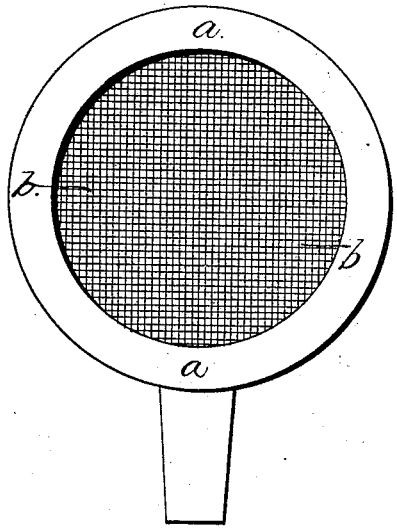
Witnesses
S. B. Kidder.
M. W. Frothingham.
Inventor
F. Monroe,
by
Crosby Halstead & Gould
Attys

United States Patent Office.

FREDERICK MONROE, OF CHARLESTOWN, MASSACHUSETTS.

Letters Patent No. 66,867, dated July 16, 1867.

IMPROVED FLOUR-BOX.

*The Schedule referred to in these Letters Patent and making part of the same.*

TO ALL WHOM IT MAY CONCERN:

Be it known that I, FREDERICK MONROE, of Charlestown, in the county of Middlesex, and State of Massachusetts, have invented an improved Flour-Box; and I do hereby declare that the following, taken in connection with the drawings, which accompany and form part of this specification, is a description of my invention sufficient to enable those skilled in the art to practise it.

The well-known culinary article designed for delivering flour evenly over an extended surface has heretofore been made with a top or cover of sheet metal, perforated with numerous holes. This construction acts faultily in vigorous use, for the reason that when the flour within the box is thrown smartly against the cover it adheres together by impact, and resting on the flat surfaces of the cover, between the perforations therein, bridges or arches them over and defeats the object of vigorously shaking the box, and consumes time unnecessarily, and often vexatiously, when the box has to be used before a very hot fire. Furthermore, the flour requires to be sifted before it is placed within a box with the ordinary perforated cover of sheet metal.

My invention consists in a new article of manufacture, the same being a flour-box, in which the cover is made of wire gauze or cloth, or in which wire gauze or cloth is inserted.

The drawing shows in plan one of the new articles; $a$ denoting a metal rim of the cover, in which the wire gauze or cloth $b$ is fixed.

It will be obvious that there are no flat surfaces on this gauze on which the flour will adhere by impact, as it does on perforated sheet metal, and experiment has shown that a flour-box made with my improvement acts efficiently to break the lumps of unsifted flour and to deliver it in quantities proportionate to the vigor with which the box is shaken.

I claim, as a new article of manufacture—

A flour-box having its cover made substantially as and for the purposes described.

FREDK. MONROE.

Witnesses:
J. B. CROSBY,
FRANCIS GOULD.